United States Patent [19]

Moser et al.

[11] Patent Number: 5,474,092
[45] Date of Patent: Dec. 12, 1995

[54] MACHINE AND METHOD FOR SORTING, FILLING AND CLOSING HOLLOW CONTAINERS

[75] Inventors: Theo Moser, Steinenberg; Reiner Wurst, Murrhardt; Klaus Reum, Stuttgart, all of Germany

[73] Assignee: R. J. Reynolds Tobacco Company, Winston-Salem, N.C.

[21] Appl. No.: 784,284

[22] Filed: Oct. 29, 1991

[51] Int. Cl.⁶ .................. A24C 5/02; B65B 1/04
[52] U.S. Cl. .................. 131/280; 131/282; 131/87; 53/282; 53/253; 53/900
[58] Field of Search ................. 131/285, 29, 70, 131/71, 72, 77, 78, 93, 87, 94, 280, 282; 198/438, 441, 443, 620, 624, 689.1, 951; 53/471, 282, 253; 86/25

[56] References Cited

U.S. PATENT DOCUMENTS

| | | | |
|---|---|---|---|
| 1,282,609 | 10/1918 | Macomber | 86/27 |
| 2,663,421 | 12/1953 | Reynolds et al. | 86/25 X |
| 3,166,177 | 1/1965 | Laverty | 198/33 |
| 3,517,480 | 6/1970 | Pinkham | 53/183 |
| 3,537,567 | 11/1970 | Nowicki | 198/33 |
| 3,544,412 | 1/1971 | Hayashi | 222/346 |
| 3,791,553 | 2/1974 | Aidlin et al. | 221/156 |
| 3,807,467 | 4/1974 | Tascher et al. | 141/375 |
| 3,933,239 | 1/1976 | Yoshida | 198/287 |
| 4,353,456 | 10/1982 | Yamamoto | 198/397 |
| 4,393,973 | 7/1983 | Ackley, Sr. et al. | 198/384 |
| 4,731,979 | 3/1988 | Yamamoto et al. | 53/529 |
| 4,782,644 | 11/1988 | Haarer et al. | 53/282 |
| 4,802,568 | 2/1989 | Haarer et al. | 198/388 |
| 4,825,995 | 5/1989 | Nalbach | 198/689.1 X |
| 4,840,266 | 6/1989 | Gherardi | 131/94 X |
| 4,870,748 | 10/1989 | Hensgen et al. | 131/93 X |
| 5,052,413 | 10/1991 | Baker et al. | 131/77 |

FOREIGN PATENT DOCUMENTS

| | | |
|---|---|---|
| 542124 | 9/1930 | Germany. |
| 396239 | 1/1974 | U.S.S.R.. |

Primary Examiner—Vincent Millin
Assistant Examiner—William M. Pierce
Attorney, Agent, or Firm—Grover M. Myers; David G. Conlin

[57] ABSTRACT

The invention provides machines and methods for continuously filling and closing containers supplied in random orientation. In one embodiment, apparatus in accord with the invention comprises a machine frame 10 that supports devices for continuously orienting, filling and closing containers. Device A supplies the containers in random orientation. Device B continuously orients the containers into a predetermined orientation. Device C continuously fills containers. Device D supplies powder or granular filler material to device C. Device E supplies plugs or stoppers for closing the containers. Device F continuously inserts plugs into filled containers to close the containers. The machine frame 10 contains the driving elements for the various devices of the apparatus.

20 Claims, 15 Drawing Sheets

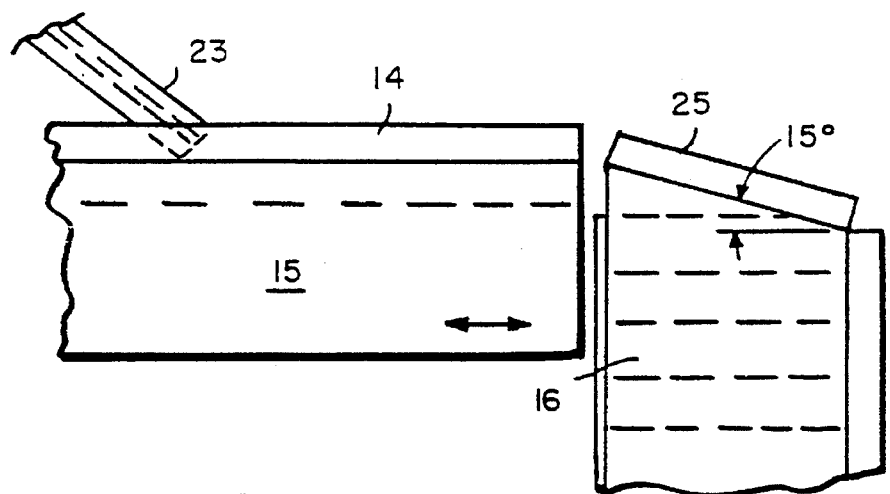
FIG. 5
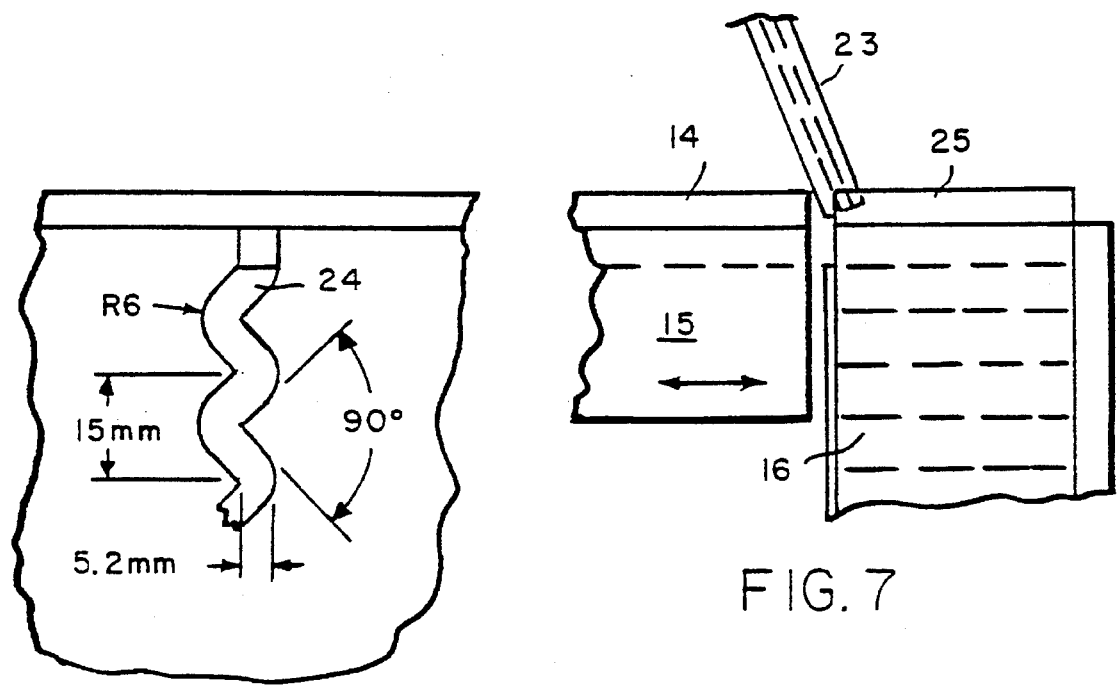
FIG. 6
FIG. 7

MACHINE AND METHOD FOR SORTING, FILLING AND CLOSING HOLLOW CONTAINERS

FIELD OF THE INVENTION

This invention relates to filling machines and particularly to machines and methods for sorting, orienting and filling open-ended containers, more particularly to machines for continuously filling and assembling fuel element/aerosol generating cartridges useful for smoking articles.

BACKGROUND OF THE BACKGROUND

Filling machines are known in the art and are generally designed to receive open containers to be filled upright and thereafter to fill and close them, requiring that the containers be disposed in upright positions before they enter the machine. It is the purpose of this invention to provide an apparatus for continuously filling containers supplied thereto from a random supply of containers by first orienting the containers to dispose them all in the same orientation and, thereafter, standing them upright, filling them and closing them, thereby eliminating the necessity for predisposing the containers prior to entry to the apparatus.

More specifically, a preferred apparatus is structured to operate continuously to receive a random supply of open-end capsules, fill them with a predetermined amount of particulate material, for example, aerosol generating material, and insert closures, such as fuel elements, in the open ends.

SUMMARY OF THE INVENTION

In accord with the present invention there is provided machines and methods for continuously feeding, orienting, filling and closing elongated containers having at least one open end and a second at least partially closed end. Such containers are useful for holding aerosol generating material used in smoking articles.

In accord with a preferred embodiment of the present invention, an apparatus is provided for continuously filling and closing containers, the apparatus having: container supply means for providing randomly oriented containers having an open end and a second, at least partially, closed end; orienting means for arranging the containers so that the open end of each container is oriented in the same direction; means for standing the containers in an upright position for filling; filling means for filling the containers; stopper supply means for delivering stoppers to close the open ends of the filled containers; and insertion means for inserting the stoppers into the open ends of the filled containers to cap them; wherein the orienting means comprises a cylindrical surface for receiving and transporting a plurality of randomly oriented containers and a mechanism for selecting and turning selected containers so that each container is oriented in the same direction on the surface after operation of the mechanism.

Preferably, the container supply means includes a receptacle for holding a supply of containers in random orientation, means for transporting the containers from the receptacle, and means for transporting and transferring the containers to the orienting means.

The stopper supply means preferably includes a receptacle for holding stoppers or plugs, e.g., fuel elements for aerosol generating cartridges filled in an apparatus of the present invention, and means for transporting and positioning the stoppers for closing the containers.

In one preferred embodiment, an apparatus in accord with the present invention provides an orientation wheel for continuously orienting a stream of containers so that the open end of each container is in the same direction. The orientation wheel comprises a plurality of stations, each station comprising a seat for receiving and holding a randomly oriented container, means for selecting the containers to be rotated, means for rotating selected containers so that the open end of the container is oriented in a predetermined direction, and means for transferring the containers from the wheel so that the station is ready to receive another randomly oriented container. If the container is received in the seat already oriented in the predetermined direction, the container is not selected for rotating and remains in the initial orientation until it is transferred from the wheel. Preferably, the selecting means comprises means for selecting containers having their open end oriented in a predetermined initial direction. In one preferred embodiment, the selected containers are transferred to the rotating means while non-selected containers are not transferred.

Preferred embodiments of the invention also comprise a rotary filling machine for continuously filling containers wherein the filling machine comprises a receptacle for holding a supply of material for filling the containers and a means for measuring predetermined quantities of material and transferring the material to respective containers.

In another embodiment of the invention, an apparatus for continuously filling containers comprises: a receptacle for holding a supply of randomly oriented containers; an orientation device for orienting the containers in a predetermined orientation; means for delivering containers continuously from the receptacle to the orientation device; the orientation device comprising a plurality of stations located around the periphery of a wheel, each station comprising means for receiving and holding a container in a predetermined position, means for selecting and transferring the container to a turning means if the container is not in a predetermined orientation, turning means for orienting the container into the predetermined orientation, means for returning the oriented container to its original position at the station; means for positioning the containers in an upright orientation for filling; container carrier means for holding the containers in the upright orientation for uninterrupted filling of the containers; means for filling each container with a predetermined quantity of material; a second receptacle for holding a supply of stoppers; stopper carrier means for holding and positioning stoppers in alignment with the filled containers; and means for inserting the stoppers into the open ends of the filled containers thereby capping the containers to keep the material inside.

In another preferred embodiment, the apparatus in accord with this invention comprises a receptacle for receiving and holding a quantity of free-flowing material, and means for delivering a predetermined quantity of the free-flowing material to each container without interruption so that the containers can be processed through the apparatus in a substantially continuous manner.

The containers which are to be filled are preferably hollow cylinders of circular cross section and the stoppers are preferably non-metallic rods of a cross section corresponding substantially to the internal cross section of the hollow metal cylinders. The free-flowing material is preferably granular.

The means for delivering containers to the orientation means preferably comprises a vibrating receptacle or hopper and parallel guide tracks extending from the hopper to deliver the containers in substantially continuous manner to the accumulation buffer for a transfer wheel.

In a preferred embodiment, the present invention provides apparatus for continuously orienting randomly oriented containers. The apparatus comprises a plurality of orientation stations positioned on the periphery of a rotatable device Each station comprises: a seat for receiving a container in a random orientation and holding it in a position parallel to its longitudinal axis, with the ends of the container positioned for determining whether the container is in the predetermined orientation and selecting containers for orienting into the predetermined orientation; a selection device for determining whether the container is in the predetermined orientation and for selecting containers for orienting into the predetermined orientation; and an orienting device for rotating the selected containers to place them in the predetermined orientation.

The transfer wheel picks up randomly oriented containers from the accumulation buffer and delivers them directly or by means of a second transfer wheel to an orientation wheel. The orientation wheel orients the containers into a predetermined orientation from which the containers are transferred to a bevelled wheel to stand the containers upright, open end up, for filling.

The means for delivering stoppers to the insertion means preferably comprises a second receptacle or hopper, means for effecting vibration of the hopper, parallel guide tracks extending from the hopper to deliver the stoppers to guide tubes, and a device for loading the stoppers into an accumulation buffer from which the stoppers are picked-up on a transfer wheel and continuously delivered to the insertion means where the stoppers are inserted into filled containers.

The filling means preferably comprises an apportioning disk containing bores along its periphery to define a predetermined volume and to deliver a predetermined quantity of material into each container, and means for supplying material to the apportioning disk. A gate or seal is disposed below the disk, movable from a position blocking said bores to a portion uncovering the same, and preferably there are plungers disposed above the bores movable through the bores to assure movement of the material contained therein into the containers. Desirably, there is vacuum means to assist retaining the containers in their seats for alignment with the bores in the disk.

In a preferred embodiment, the present invention further provides apparatus for continuous filling of containers. The apparatus comprises a plurality of continuously moving filling stations positioned on the periphery of a rotatable device. Each station comprises: a seat for receiving and holding a container with its open end up for filling; a measuring device for holding a predetermined quantity of filler material; filling apparatus for filling the measuring device with filler material; and transfer apparatus for transferring measured predetermined quantity of filler material to the open container.

Another preferred embodiment of the invention provides apparatus for continuous closing of containers by inserting a plug into the open end of a container. The apparatus comprises a plurality of continuously moving closing stations positioned on the periphery of a rotatable device. Each station comprises: a first seat for receiving and holding a filled container, open end up; a second seat for receiving and holding a plug in fixed relation to the container; restraining apparatus for restraining the movement of the open end of the container during insertion of the plug; and push pin apparatus for inserting the plug into the open end of the container.

In another embodiment, the invention provides a machine for making fuel element/aerosol generating cartridges useful in smoking articles such as described in European Application Publication No. 0174645 published Mar. 19, 1986, which is hereby incorporated by reference. In this embodiment, an apparatus in accord with the invention preferably has means for continuously orienting and standing upright elongated capsules upon at one end and at least partially closed at the other end for filling, means for continuously filling capsules with an aerosol generating material through the open end, and means for continuously closing the open ends by inserting a fuel element therein. More particularly, the apparatus comprises a rotary transfer means including container carrier means and stopper carrier means; for continuously providing upwardly-oriented containers to the filling means and stoppers to the insertion means. The apparatus preferably includes a first receptacle for holding a random supply of containers, a means for continuously orienting the containers to a position wherein their open ends are upwardly oriented, a means for continuously delivering containers from the first receptacle to the orienting means, and means for delivering and transferring the upwardly oriented containers to the filling means; a second receptacle for holding a supply of fuel elements and a means for continuously delivering and transferring fuel elements to the insertion means; a material supply means including a third receptacle for holding a supply of the aerosol generating material to be loaded into the containers and a means for continuously delivering the material into the open ends of the containers; and a means for continuously inserting the fuel elements into the open ends of the filled containers.

A preferred machine for continuously making fuel element/aerosol generating cartridges for smoking articles comprises:

an orienting device comprising a plurality of continuously moving orientation stations, each orientation station having a seat for receiving and holding elongated containers in randomly oriented positions, a selecting device for selecting containers, and an orientation cylinder for orienting selected containers to position them in a predetermined orientation;

a filling device comprising a plurality of continuously moving filling stations, each filling station having a filling seat for receiving and holding oriented containers, and apparatus for measuring a predetermined amount of aerosol generating material and filling each container with a predetermined amount of material;

a closing device comprising a plurality of continuously moving closing stations, each closing station having a container seat for receiving and holding filled containers, a fuel element seat for receiving and holding fuel elements, and apparatus for inserting the fuel element into the open end of the filled container to provide a closed container;

container supply apparatus for supplying randomly oriented containers to the orienting device;

transfer apparatus for transferring containers between the orienting device, the filling device and the closing device;

fuel element supply apparatus for supplying fuel elements to the closing device; and unloading apparatus for removing closed containers from the machine.

In accord with the present invention a method for continuously making fuel element/aerosol generating cartridges for smoking articles is also provided. A preferred method comprises: continuously supplying randomly oriented containers; orienting the containers into a predetermined orientation on a continuously rotating orienting device by selecting the containers that are not in the predetermined orientation, loading the selected containers on the orienting device, and rotating the selected containers into the predetermined orientation; continuously supplying aerosol generating material to be filled into the containers in a predetermined quantity; measuring predetermined quantities of the aerosol generating material using a continuously rotating disk having a plurality of bore holes located and equally spaced at the periphery of the disk, the bore holes sized to hold the predetermined quantity of material; continuously positioning containers in relation to the bore holes on a continuously rotating filling device; transferring the measured quantities of aerosol generating material from each hole to the container positioned in relation thereto, thereby filling the containers on the filling device; continuously supplying fuel elements to close the filled containers; positioning on a continuously rotating closing device fuel elements in relation to filled containers for inserting a fuel element into each filled container; and inserting a fuel element into each filled container to close the container on the closing device.

Various apparatus in accord with the present invention accomplish the steps of orienting, filling and closing containers with the container in continuous motion and not by an indexing procedure where the containers are stopped during operations.

BRIEF DESCRIPTION OF THE DRAWINGS

FIG. 5 diagrammatically shows the mechanism for transfer of capsules from the guide track to the cascade.

FIG. 6 illustrates the preferred groove configuration for the cascade.

FIG. 7 illustrates additional air jet assist for transfer of capsules into the cascade.

DETAILED DESCRIPTION OF PREFERRED EMBODIMENTS OF THE INVENTION

Figure 1:
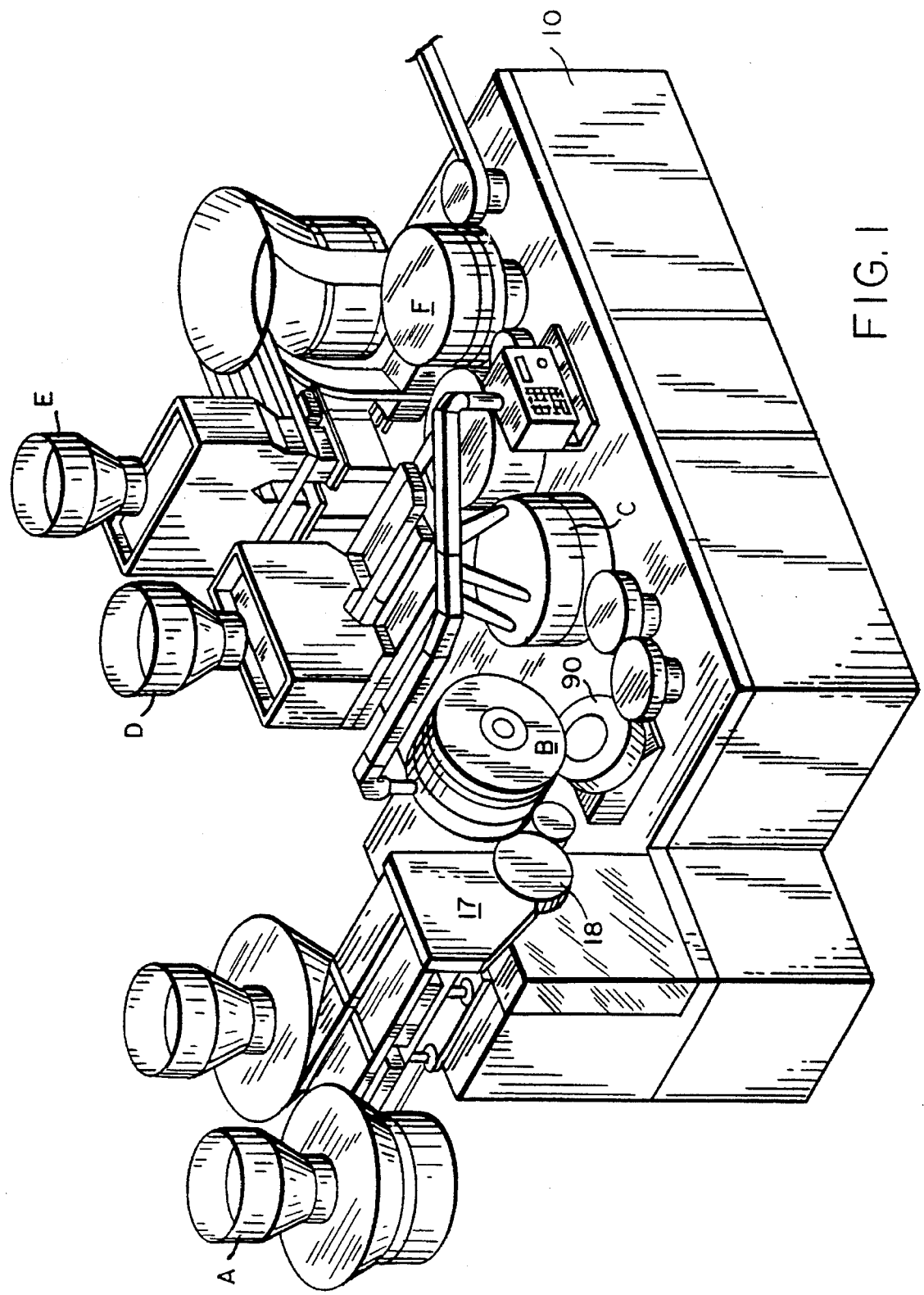
FIG. 1 is a perspective view of a preferred embodiment of an apparatus in accord with the present invention.

Referring to the drawings, FIG. 1 shows one embodiment of an apparatus for feeding containers or capsules, open at one end, in random orientation, orienting the capsules, filling the capsules with a powder or granular material, feeding plugs to close the capsules, and closing the filled capsules, all in a continuous manner. The apparatus comprises a machine frame 10 and six primary devices A, B, C, D, E and F for accomplishing the functions of the apparatus.

The machine frame 10 contains the driving elements of the various devices and equipment of the apparatus. Conventional gears, drive belts, timing belts, etc. are used to operate the apparatus. Device A is where the capsules or containers are supplied. Typically, the capsules filled and closed by the apparatus of the present invention are hollow elongated bodies having one open end and a second closed or partially closed end. Device B is the orienting drum or wheel where capsules continuously supplied in random orientation are all oriented into a predetermined orientation for continuously supplying the filling device. Device C is where the capsules are filled with metered portions of a powder or granular material. Device D supplies the powder or granular material to the filling device. Device E is where plugs or stoppers are supplied to the apparatus. Device F is where the plugs are inserted into the open ends of the filled capsules to close them. At least devices B, C and F operate in a manner wherein the capsules are in continuous motion.

Figure 2:
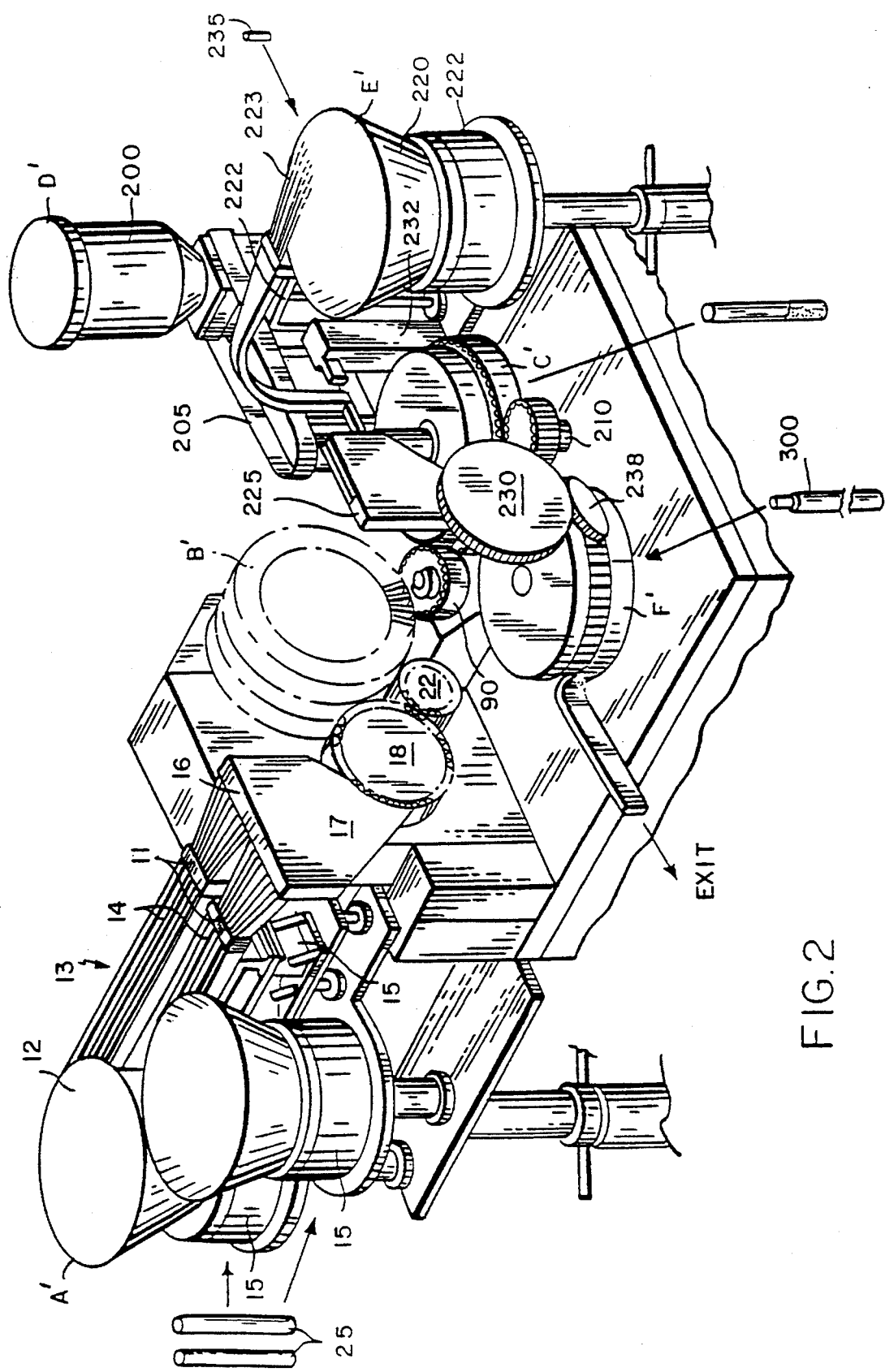
FIG. 2 is a perspective view of another preferred embodiment of an apparatus in accord with the present invention.

FIG. 2 diagrammatically shows an alternative preferred apparatus for continuously performing the same functions as the apparatus of FIG. 1 Devices A', B', C', D', E' and F', of FIG. 2 correspond respectively to devices A, B, C, D, E and F of FIG. 1. The devices of FIG. 2 are positioned in a preferred arrangement having a minimum number of transfer drums or wheels between the six primary devices. FIG. 2 also diagrammatically shows the status of the capsules and plugs at various points in the apparatus illustrating, for instance, a capsule filled with a predetermined quantity of filler material and closed with a plug at the EXIT.

The capsule supply device A', FIG. 2 comprises hoppers 12 from which external distributors 13 embodying a plurality of guide tracks 14 located parallel to one another, a cascade 16, accumulator 17 and a feed drum 18. The hoppers 12 are filled with randomly oriented capsules 25. Electromagnetic vibrating means 15 associated with the hoppers and distributors provide for effecting longitudinal orientation of the capsules, delivery into the guide tracks and movement along the guide tracks. The guide tracks 14 deliver the capsules to a cascade 16 which maintains the capsules in a horizontal position for delivery to an accumulator 17 for loading the capsules on the feed drum or feed wheel 18 which is continuously rotating. Preferably, the capsules are fed through a gauge block 11 which is positioned along the guide tracks 14 before the cascade 17. Oversize or misshapen capsules are caught by the gauge block 11 and removed by raising the gauge block (in a manner not shown) and removing the capsules by air pressure or mechanical means.

Figure 3:
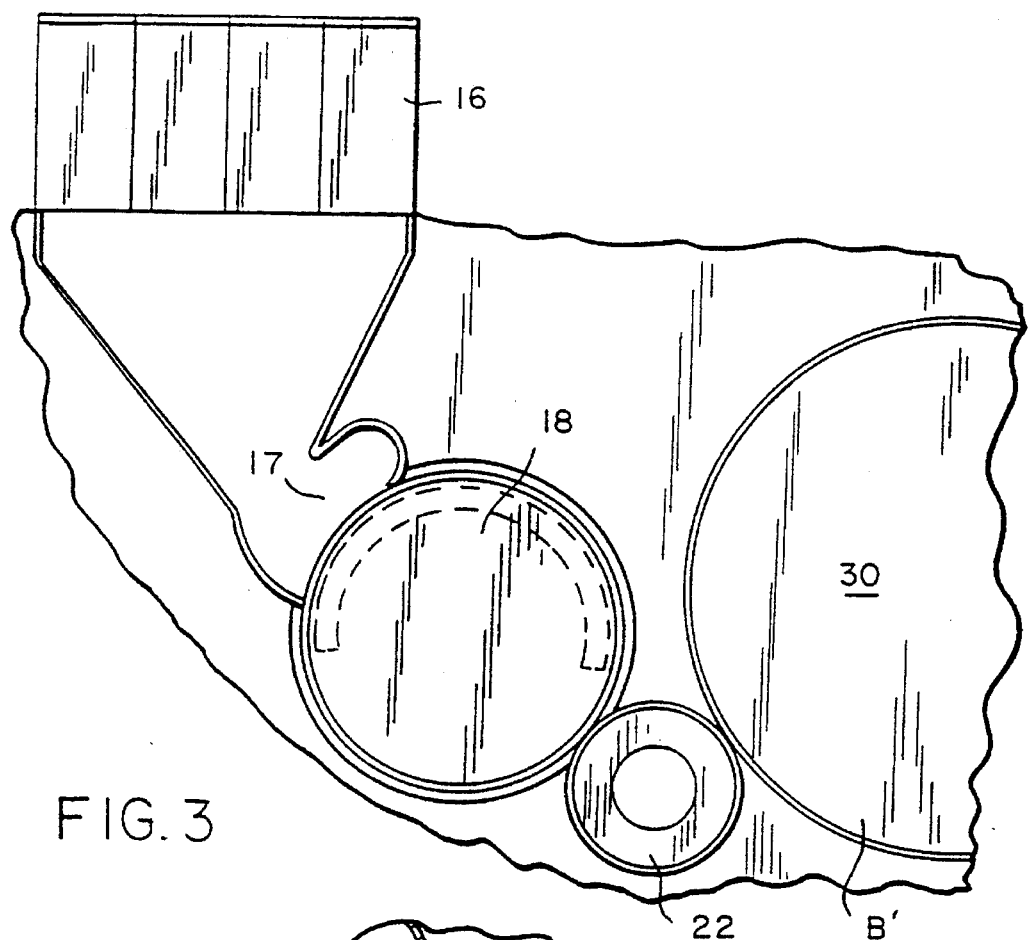
FIG. 3 is a elevational view showing a portion of the apparatus of FIG. 1 including the capsule feed station illustrating the capsule accumulator and capsule feed drum, a transfer drum, and the orienting drum.
Figure 4:
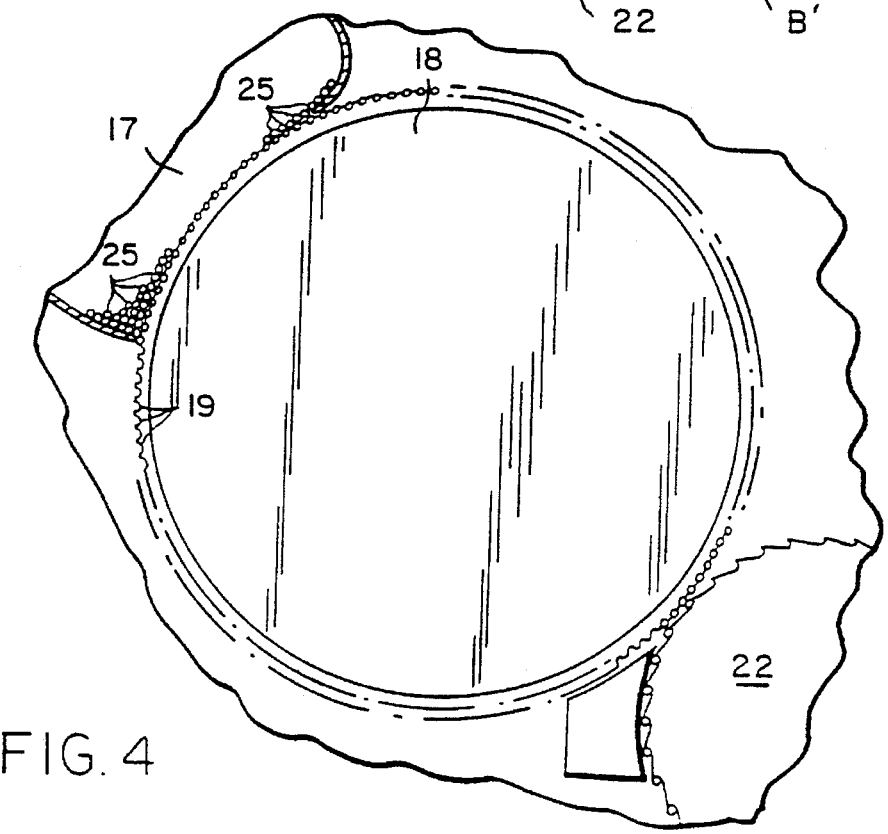
FIG. 4 is an enlargement of a portion of FIG. 3 illustrating in more detail, the loading of capsules onto the capsule feed drum from the accumulator.

The arrangement of the cascade 16, accumulator 17 and feed drum 18 is illustrated in FIG. 3 along with transfer drum 22 and orientation drum B'. FIG. 4 is an enlargement of a portion of the arrangement in FIG. 3 showing the loading of capsules 25 from accumulator 17 onto the feed drum 18 and transfer of capsules 25 from the feed drum 18 to transfer drum 22.

After passing through cascade 16, the capsules 25 are stored in accumulator 17 for loading onto the feed drum 18. An excess of capsules 25 in the accumulator permits the feed drum to pick up a capsule in each seat or pocket 19 in the drum in a continuous manner. The capsules are held in the seat 19 with vacuum assistance (not shown). By loading the feed drum 18 in this manner, a continuous feeding of capsules is accomplished for the apparatus. The capsules 25 are then picked off the feed drum 18 by transfer drum 22 and transferred to the orientation drum B' by conventional means.

Optionally, as shown in FIG. 5, a tube 23 having pressurized air can be used to accelerate the capsules in guide tracks 14 just prior to the cascade. Preferably, the capsule enters the cascade at no more than a 15 degree angle as shown in FIG. 5.

The cascade is preferably a series of sinusoidal passages 24 (FIG. 6), one for each guide track 14. The cascade passages prevent the capsules from falling directly into the accumulator and maintain the capsule in a horizontal position as it enters the accumulator. Each passage is preferably defined by side walls having 90 degree intersections alternating with a radius section as shown in FIG. 6. For capsules having a diameter of 4.5 mm, it is preferred for optimum results that the distance between the side walls be about 5.2 mm, the 90 degree intersection is be spaced 15 mm apart and the radius R6 be 6 mm as shown in FIG. 6. A plurality of such radius turns and intersections is used for the cascade passages to traverse the desired vertical distance to the accumulator bin.

As the capsules 25 enter the cascade 16, optionally an air pressure tube 23 (FIG. 7) can be used to facilitate transfer from guide track 14 into the cascade passageway.

Figure 8:
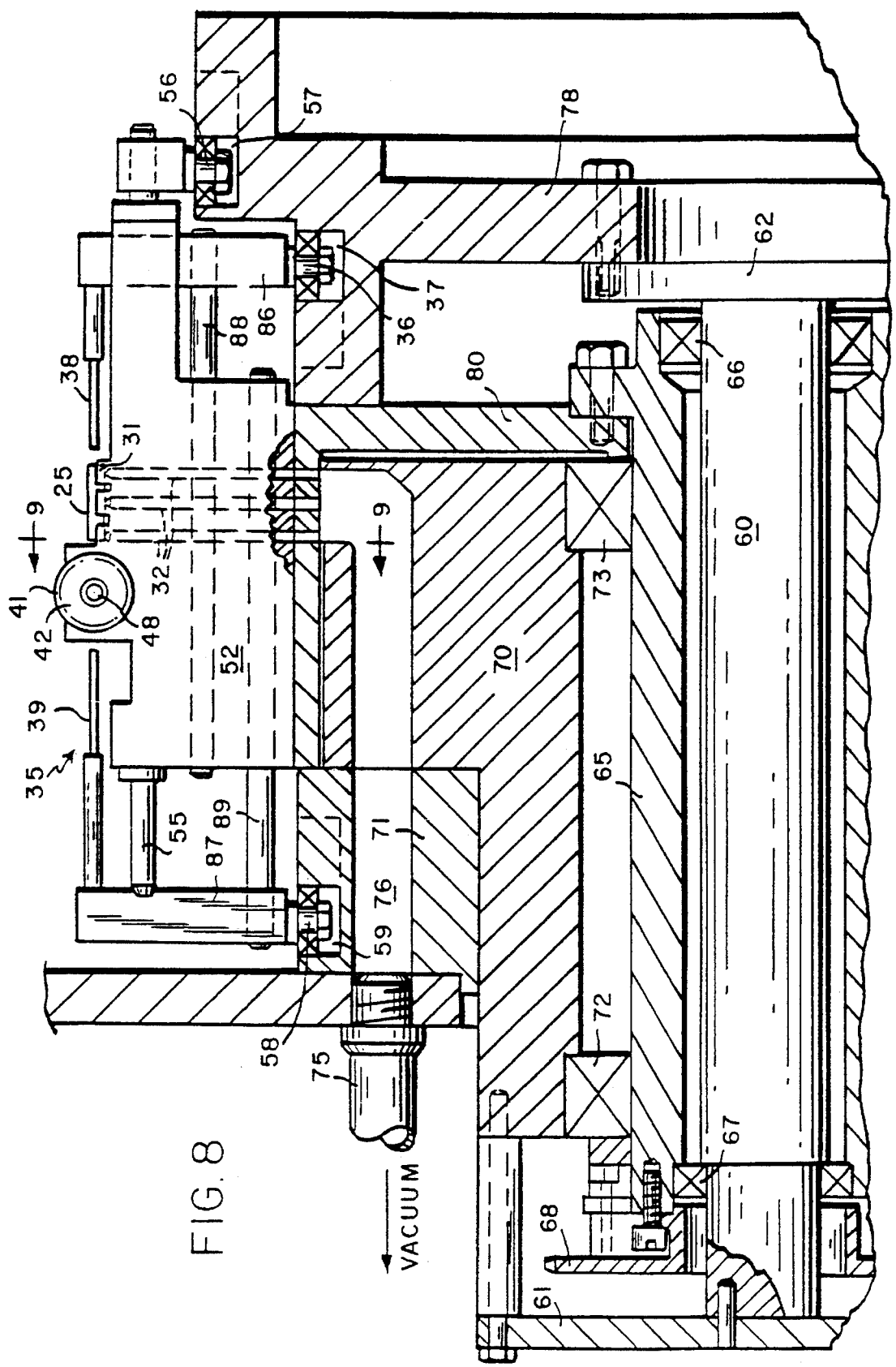
FIG. 8 is a partial sectional view in elevation, illustrating a station of the orienting drum.
Figure 9:
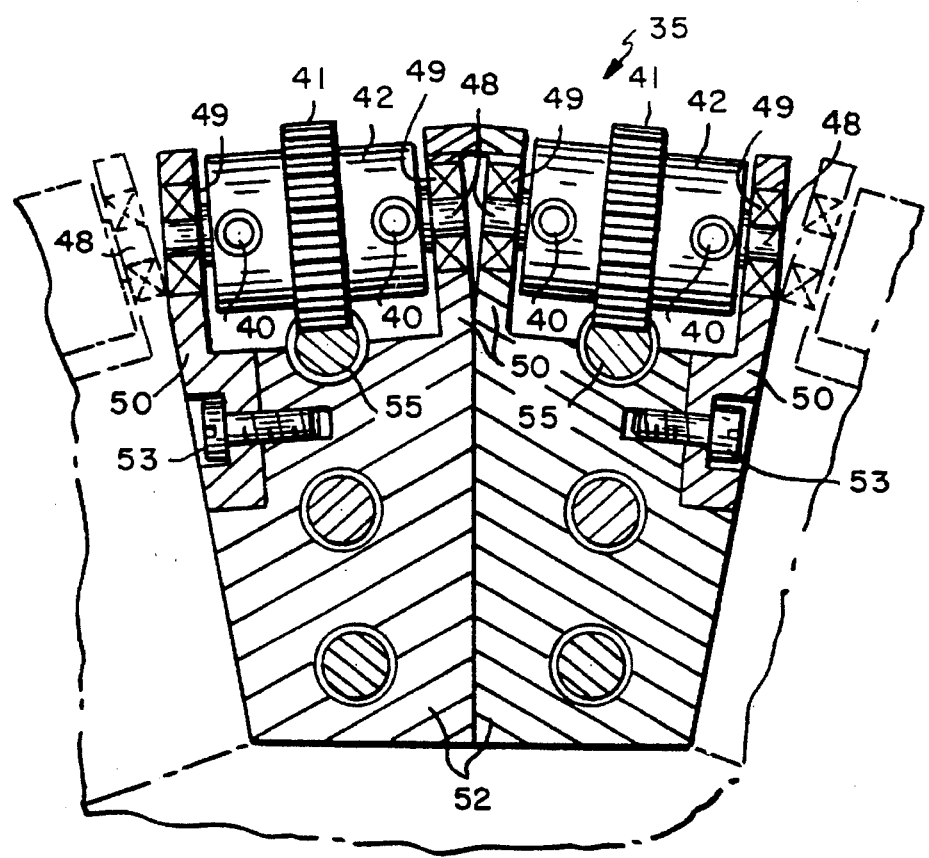
FIG. 9 is a partial side view, partly in section, looking at line 9—9 of the station of FIG. 8.
Figure 10:
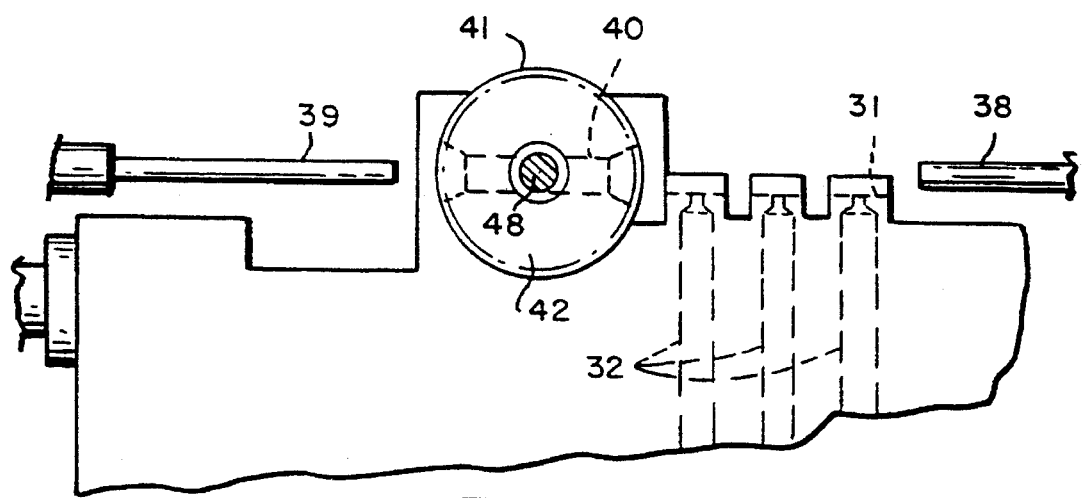
FIG. 10 is a diagrammatic view illustrating an orienting station of FIG. 8.

The orienting device B' comprises a drum 30 on which having a plurality of stations 35 located on its periphery. Each station 35, FIG. 8, FIG. 9 and FIG. 10, has a pocket or seat 31 dimensioned to receive and hold a capsule. Vacuum is supplied through vacuum bores 32 to hold the capsule in the seat 31 as the drum rotates. As the drum rotiates, push pin 38 is moved toward capsule 25 through the action of cam follower 36 following cam track 37. If the open end of the capsule faces the pin 38, the pin enters the capsule. If the closed end of the capsule faces the pin 38, the pin pushes the capsule into a bore hole 40 in orienting cylinder 42. The orienting cylinder 42 has two bore holes 40 to accommodate two capsules at a time. The cylinder 42 rotates on shaft 48 in bearings 49 located in side walls 50 in block 52. One side wall 50 in each block 52 is removably held to the block with a machine bolt 53. The orientation cylinder also comprises a gear wheel 41 which engages a pinion located on rod 55 to rotate the cylinder thereby changing the orientation of the capsule in bore 40.

Rod 55 and the pinion traverse a distance calculated to turn the cylinder 180 degrees. The movement of rod 55 and, thus, the rotation of cylinder 42 is governed and controlled by cam follower 56 in cam track 57.

After the capsule has been oriented by rotation of cylinder 42, push pin 39 is moved to push the capsule from the cylinder into position in channel 31. The motion of push pin 39 is controlled by cam follower 58 in cam track 59.

A plurality of stations 35 are positioned around drum 30. Preferably, each station simultaneously can orient a plurality of capsules. In the embodiment illustrated in the drawings, each station can orient 4 capsules. Other configurations for each station are readily conceived. For instance, one orientation cylinder could be used instead of two at each station. Also, the capsules may be rotated horizontally instead of in a vertical plane, as shown in the drawings.

Structurally, the orientation drum comprises a stationary shaft 60 having end plates 61 and 62. Around the stationary shaft is a cylinder 65 that rotates around shaft 60 on bearings 66, 67 and is driven by gear wheel 68. Surrounding the rotating cylinder 65 is support structure 70 which is fixedly attached to end plate 61 and spaced from the rotating cylinder 65 by bearings 72, 73. The support structure 70 has a vacuum port 75 and channels 76 for distributing vacuum to bores 32 in each station 35. Support structure 70 also has cam track 59 shown in FIG. 8 as part of a separate collar 71.

Attached to end plate 62 is stationary plate 78 in which are machined cam tracks 37 and 57.

Each station 315 is mounted to cylinder 65 by an L-plate 80 to which blocks 52 are mounted. Blocks 52 also have bores for guide rods 88 and 89. Guide rod 88 is connected to support 86 for stabilizing the movement of push pin 38. Similarly, guide rod 89 is connected to support 87 to stabilize push pin 39.

As the stations 35 rotate around drum 30 the motions of push pins 38, 39 and orientation cylinder 42 are controlled by the movement of cam followers 36, 56, 58 in cam tracks 37, 57, 59. During rotation the following sequence occurs (FIGS. 8, 9, 10): first cam follower 36 moves to the left in cam track 37 and push pin 38 moves to the left a predetermined distance to push a capsule 25 into bore 40 of the cylinder 42; then, the cam follower 36 is caused to move to the right to return push pin 38 to its original position; as the cam follower 36 moves to the right, cam follower 56 also moves to the right following cam track 57 causing the pinion on rod 55 to turn gear wheel 41 thereby rotating cylinder 42 by 180 degrees; next, cam follower 58 moves to the right following cam track 59 to move push pin 39 into bore 40 of cylinder 42 to push the capsule out of the bore to its initial position in seat 31, then cam follower 58 is moved to the left to return the push pin 39 to its original position; and as cam follower 58 moves to the left, cam follower 56 also moves to the left to return the cylinder 42 to its original position. At that point all cams and rods and the cylinder are in their original positions and the sequence can be carried out again during the following revolution of cylinder 65.

Figure 11A:
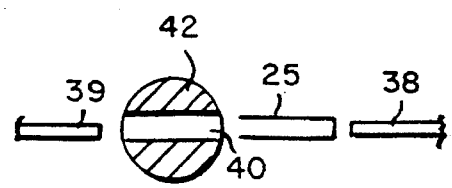
FIG. 11a through FIG. 11e diagrammatically illustrate the sequence of movement of the orienting station for a capsule having its open end facing to the left of the figure.
Figure 12A:
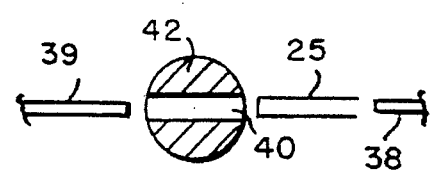
FIG. 12a through FIG. 12e diagrammatically illustrate the sequence of movement of the orienting station for a capsule having its open end facing to the right of the figure.
Figure 11B:
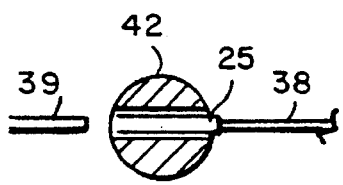
Figure 11C:
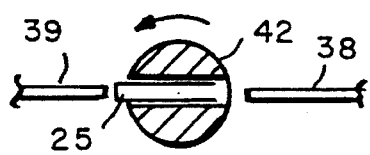
Figure 11D:
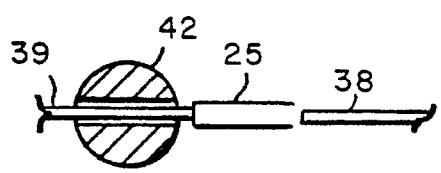
Figure 11E:
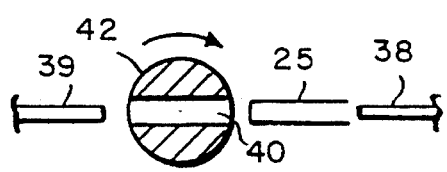

The movement of the components of station 35 accomplishes the predetermined orientation of capsules 25 in seat 31 with the open end facing to the right. This orientation operation is further illustrated in FIGS. 11a–11e and 12a–12e as follows. FIG. 11a illustrates a capsule 25 in seat 31 with its open end toward the left. In FIG. 11b, push pin 38 has completed its movement to the left, during which it encounters the closed end of capsule 25 and pushes the capsule into bore 40 of the orientation cylinder 42. In FIG. 11c, orientation cylinder 42 is rotated 180 degrees counterclockwise, orienting the capsule 25 with its open end now toward the right. In FIG. 11d, push pin 39 clears the bore of cylinder 42 by pushing the capsule back into its original position in seat 31, however, with the open end reoriented to the right. FIG. 11e shows the orientation cylinder 42 being returned to its original position by rotation 180 degrees clockwise.

Figure 12B:
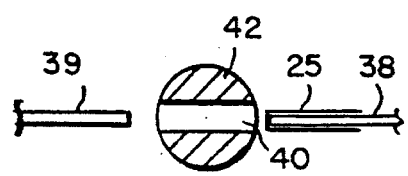
Figure 12C:
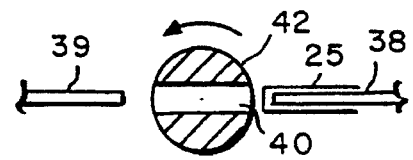
Figure 12D:
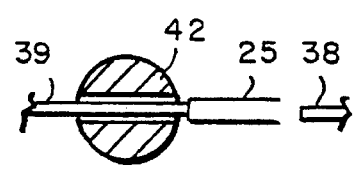
Figure 12E:
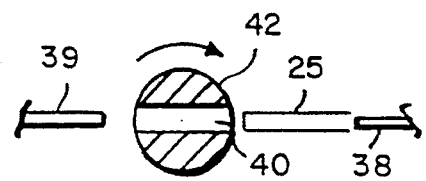

FIGS. 12a–12e illustrate the sequence of movements of station 35 when a capsule 25 is loaded into seat 31 with the open end toward the right (FIG. 11a). The same sequence is conducted by the mechanical components. However, as shown in FIG. 12b, capsule 25 remains in the seat because push pin 38 merely enters the open end of the capsule and travels the length of the capsule without pushing the capsule into the bore 40 of cylinder 42. FIGS. 12c–12e show the remaining movements being accomplished, without affecting capsule 25, to present the station components in their original position at the end of the cycle.

Figure 13:
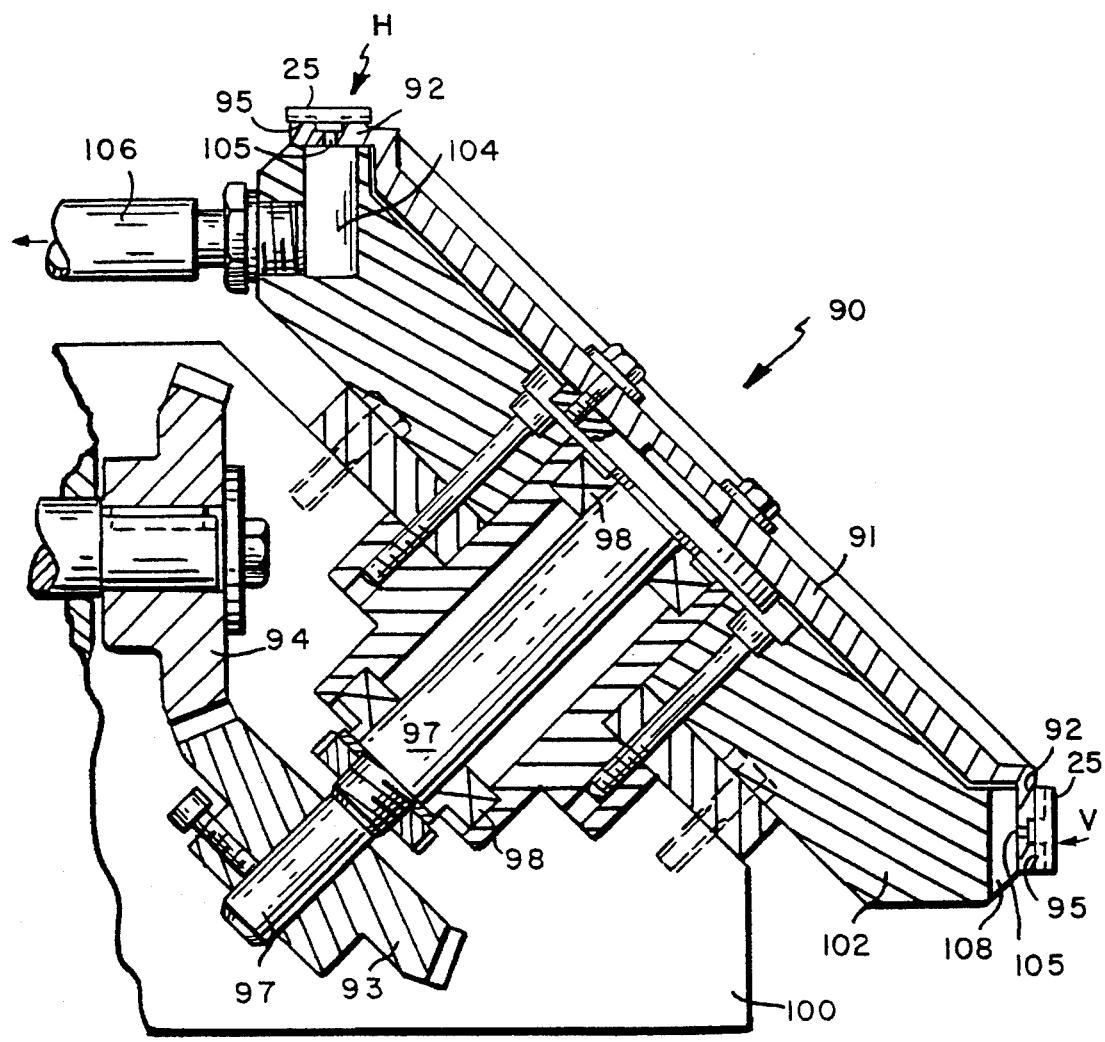
FIG. 13 is a sectional view of a wheel for changing the orientation of the capsule from horizontal to vertical.

In this position 11e, 12e the capsule is removed from the orientation wheel 30 in the horizontal position and turned into an upright vertical position, with the open end up, for filling. This is accomplished by a beveled wheels 90 as shown in FIG. 13. The wheel 90 comprises a plate 91 machined with an edge surface 92 beveled at 45 degrees. The edge surface 92 has a plurality of channels 95 to hold capsules 25. The plate 91 is attached to an axel 97 positioned in a block 100 at a 45 degree angle so that the capsules can be picked from the orientation drum B' in a horizontal position (H) and loaded onto the filling device C' in the vertical position (V). The beveled wheel 90 is driven by gears 93, 94 turning the axel 97 in bearings 98. Attached to block 100 is a collar 102 which provides a machined mating surface for plate 91. Collar 102 has a channel 104 for supplying vacuum to the channels 95 to aid in removing the capsules 25 from the orientation wheel and holding them during rotation of wheel 90. Vacuum is supplied through vacuum tube 106. The collar 102 also has an opening 108 to the atmosphere at the vertical position (V) so that the capsules can be transferred to the filling device C'.

Figure 14:
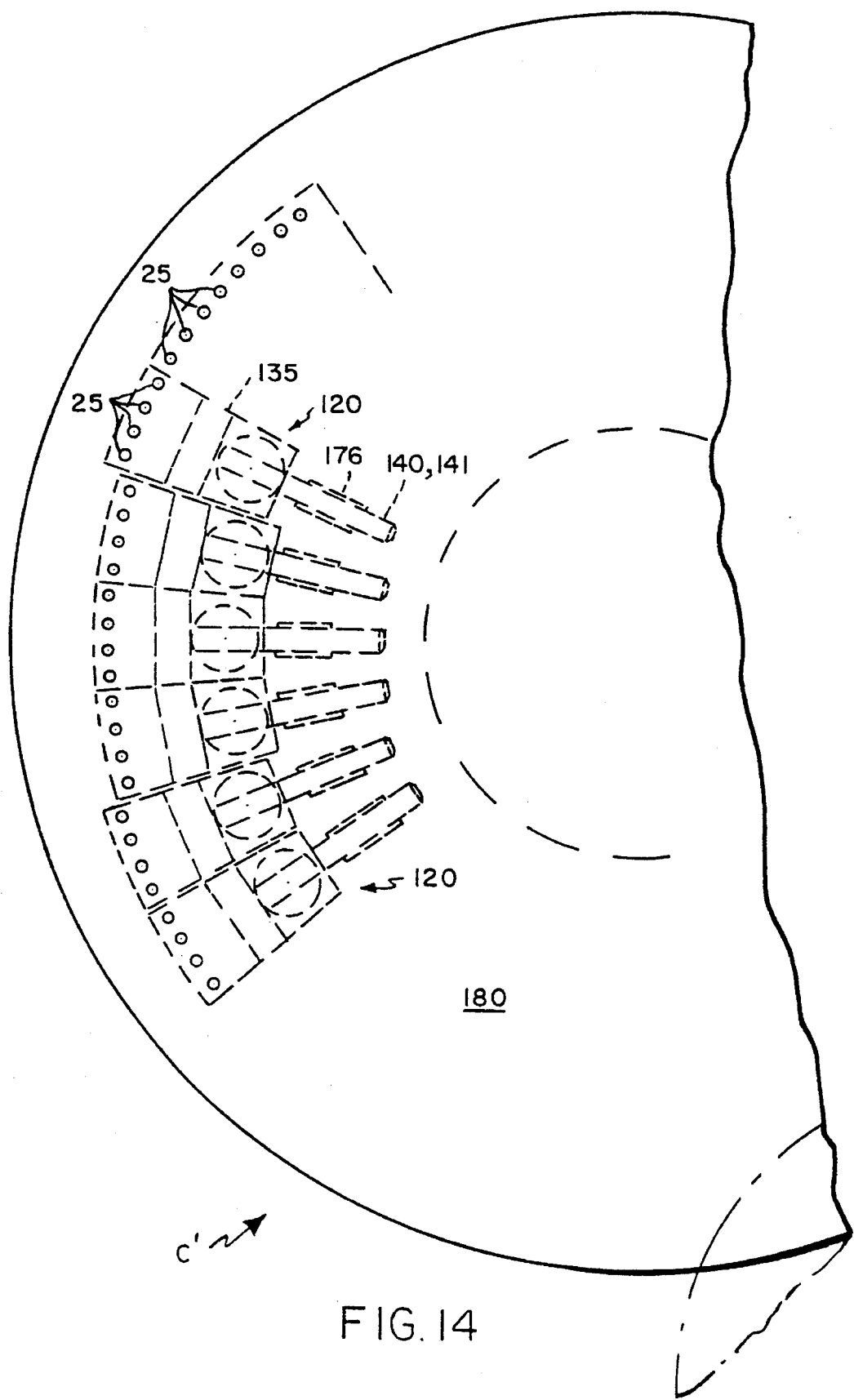
FIG. 14 is a plan view diagrammetically illustrating the radial movement of stations on a preferred filling device for filling capsules in the apparatus of FIG. 2.

The filling device C' is illustrated in FIG. 14 by a plan view showing a plurality of filling stations arranged circularly. FIG. 14 illustrates the radial movement of certain filling station components as will be explained in detail.

Figure 15:
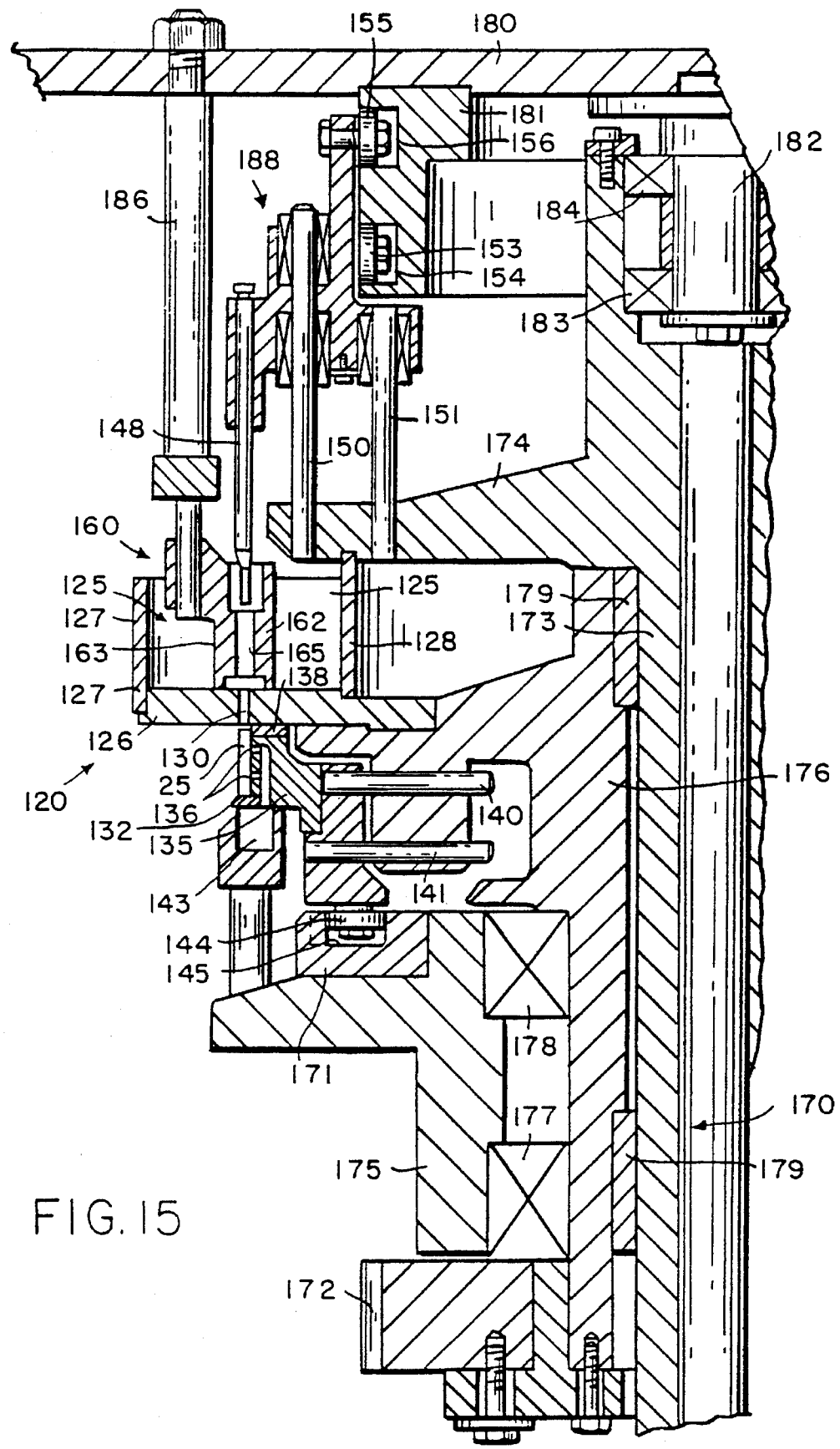
FIG. 15 is a partial sectional view in elevation, illustrating a station of the capsule filling device.

With reference to FIG. 15, the filling device comprises a cylindrical channel 125 formed by horizontal feed plate 126 at the bottom, exterior vertical wall 127 and interior vertical wall 128. The feed plate 126 has a plurality of feed bores 130 of predetermined size to meter powdered or granular filler material into the capsules 25. Each capsule is held in a vertical position in a seat 132 in capsule holding block 135. The capsule holding block has channels 136 to supply vacuum to hold the capsule firmly in place during the filling operation. Attached to the holding block 135 is seal 138 which closes the feed bores 130 to contain the filler material except when the capsule 25 is being filled. Capsule holding block 135 slides radially on guide rods 140, 141 by the movement of cam follower 144 in cam track 145. Vacuum is provided to the channels 136 through channel 143.

To aid in filling the capsule, a plunger 148 is associated with each feed bore 130. When the capsule is in position for feeding (as shown in FIG. 15) the plunger 148 moves downward on guide rods 150, 151 by the movement of cam followers 153, 155 in cam tracks 154, 156, respectively.

The capsule feed plate 126 and the feed stations 120 rotate in a circle in one revolution, a capsule 25 is loaded in seat 132 in holding block 135, filler material flows into feed bore130, holding block 135 with seal 138 moves radially inwardly to permit the filling material to fall into the capsule, plunger 148 is moved into feed bore 130 to ensure that the entire metered dose is filled into the capsule, the plunger is withdrawn, the holding block is moved radially outward to seal the feed hole, and the filled capsule is transferred from the holding block.

A stationary guide fence 160 is located over a portion of the circumference of the feed plate 126. During this portion of the circumference of the filling device, the filling material is transferred to the capsules.

The guide fence 160 is curved structure having an inner vertical wall 162 and an outer vertical wall 163 spaced apart so that (when viewing from above) the feed bores 130 move through the open channel 165 formed by the guide fence 160. The channel 165 provides a guide for the movement of plungers 148 to clear the feed bores 130.

The guide fence 160 is positioned against feed plate 126 so that the guide fence scrapes loose filler material from the top of feed plate 126 to precisely fill feed bores 130 and leave no loose filler material in channel 165. Except for the portion of feed plate 126 covered by guide fence 160 with its open channel 165, the feed plate is typically covered by filler material throughout cylindrical channel 125 which is supplied by filling material supply device D'.

Structurally, filling device C' comprises a cylindrical rotatable support structure 170 driven by gear 172. The rotatable support structure 170 is set in machine frame 175 and rotates therein on bearings 177, 178. Attached to the machine frame 175, by means not shown, is horizontal plate 180 to which is attached a hub 182 to stabilize the rotating support structure 170. Bearings 183, 184 permit rotation of the upper end of support structure 170 around hub 182.

Rotating support structure 170 supports the filling stations 120 and comprises by comprising two primary support structures. Inner support 173 provides a cylindrical shaft rotating around hub 182 at the upper end. The inner support 173 has disk extension 174 (an arm in cross-section, FIG. 15), from which plunger 148 for each station is mounted by means of rods 150, 151. The outer support 176 is spaced apart from the inner support 173 by spacer rings 179. The outer support 176 has fixedly attached thereto the feed plate 126. The capsule holding block 135 for each station is mounted to the outer support 176 by means of rods 140, 141. Cam tracks 145, 154, 156 are machined into removable cylindrical blocks 171, 182 which are attached to the machine frame 175 and to plate 180, respectively, to control movement of the capsule holding block 135 and plunger 148. Preferably, the cylindrical blocks 171, 181 are made in sections, for ease of removal.

The guide fence 160 is supported from plate 180 by rods 186.

In the preferred embodiment, each filling station 120 comprises a capsule holding block 135 having seats 132 for four capsules 25 and a plunger cam block 188 having four plungers 148 that move in unison. Alternative embodiments having more or less capsules being filled and moved in unison can be made by a skilled mechanic following the teachings herein.

The filler material can be supplied in one filling step from suitable rigid feed bores 130 in the feed plate. However, for larger volumes, the capsules can alternatively be filled in two or more steps using additional continuously moving stations with additional feed disks.

Figure 16:
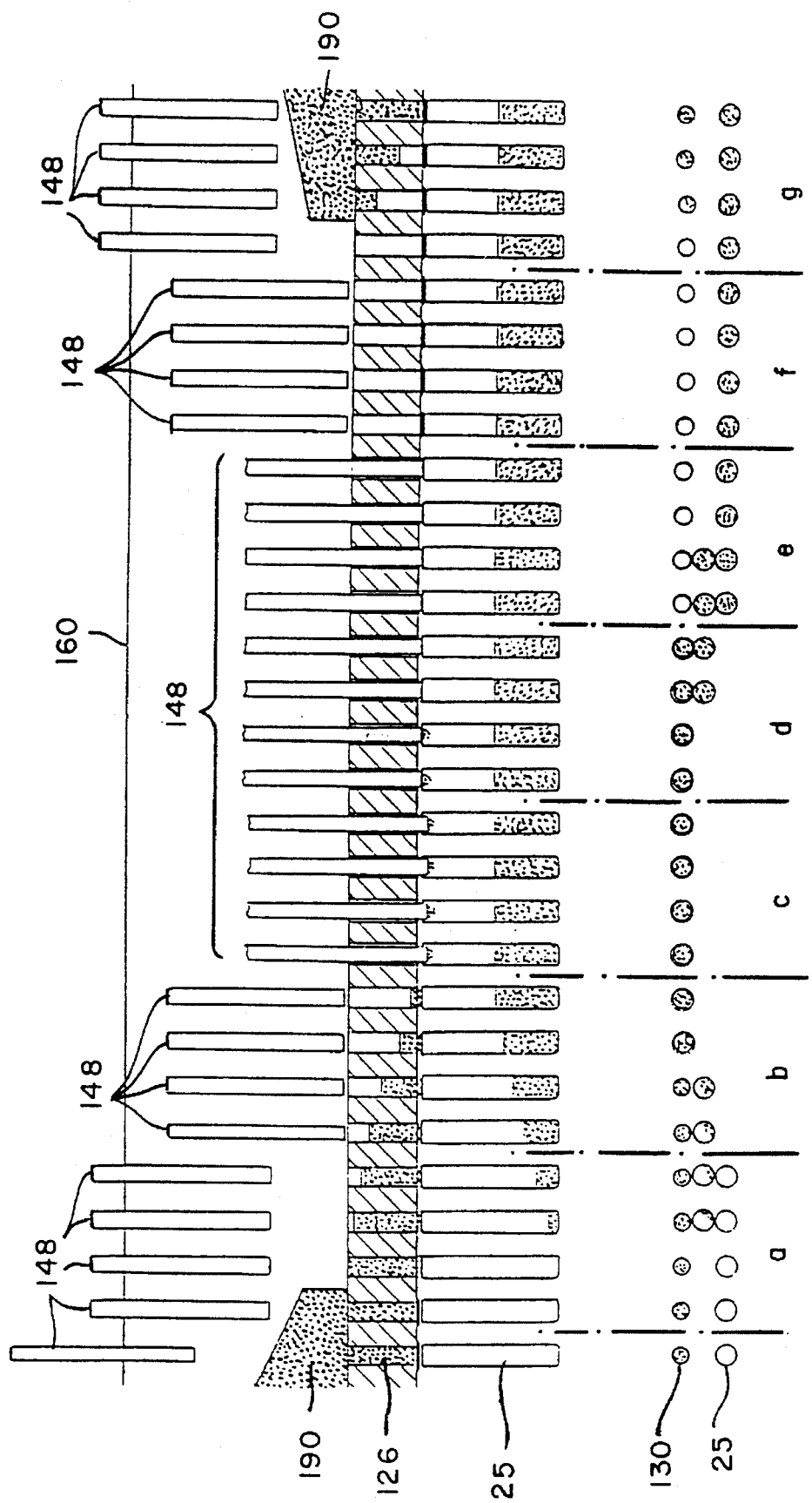
FIG. 16 diagrammetically shows the sequence of movement of the stations of the filling device for filling capsules.

FIG. 16 illustrates the sequence of movements at each station 120 as it passes the guide fence 160. Although the guide fence 160 and travel path are circular, FIG. 16 is illustrated in a linear arrangement for convenience. FIG. 16 illustrates in elevation the motion of plungers 148 in relation to feed disk 126 and capsules 25 positioned beneath the feed plate as stations a through g move past guide fence 160. Also shown in FIG. 16, beneath the elevational illustration, is a plan view illustration of the feed bores 130 and movement of capsules 25 relative to the feed bores as the stations a through g pass the guide fence 160.

As the feed plate 126 and stations rotate, empty capsules are transferred from beveled wheel 90 to seats 132 in the stations and filling material is metered into channel 125 above the feed plate. As the feed plate 126 approaches the guide fence 160, the portion of the feed plate that passes under the guide fence, which contains the line of feed bores 130, is scraped clean of filling material 190 provided a metered dose of filling material in each feed bore. The guide fence has a length equivalent to the dimensions of about seven filling stations. As the filling stations move past guide fence 160 they go through a sequence of movements as illustrated by stations a through g in FIG. 16. As the station begins to pass the guide fence 160, as illustrated by station a, plungers 148 begin to lower in channel 165 of the guide fence due to cam followers 153, 155 following cam tracks 154, 156. As the station moves from the position of station a to the position of station b, the plungers continue their movement downward and the capsule holding block moves radially inward due to cam follower 144 following cam track 145, thereby moving seal 138 from under feed holes 130 and positioning capsules 25 beneath feed bores 130, whereby filling material begins to fall into the capsules. As the station moves through the positions of station c and station d the plungers 148 continue their movement downward through feed bores 130 to ensure that the entire metered dose of filling material has been transferred to the capsules. As the station moves from the position of station d to the position of station e, the capsule holding block is moved radially outwardly again sealing the feed bores 130 and moving filled capsules 25 outward for transfer from the filling device C'. As the station moves through the positions of stations f and g, the plungers are retracted to their original positions, and the feed bores come out from under guide fence 160 where filling material 190 moves into the feed bores to fill them prior to rotating under the guide fence on the next cycle.

Feeding device D' for delivering filling material to the filling device C' comprises a hopper 200 (FIG. 2) and a vibrating channel 205 for metering the powder or granular material on to feed plate 126 and into channel 125 (FIG. 15) of the filling device C'.

After the capsules are filled, they are removed from seats 132 by transfer wheel 210 (FIG. 2) and loaded on the closing device F' where they are closed or capped by stoppers or plugs 235, which are generally of non-metallic material and usually have a cross-sectional appearance to fit snugly into the capsules 25 to contain the filling material. Preferably, the material from which the plugs are made is adapted for the particular use and can be elastomeric or even a carbon plug such as when used for closing an aerosol generating cartridge for use in a smoking article.

Figure 17:
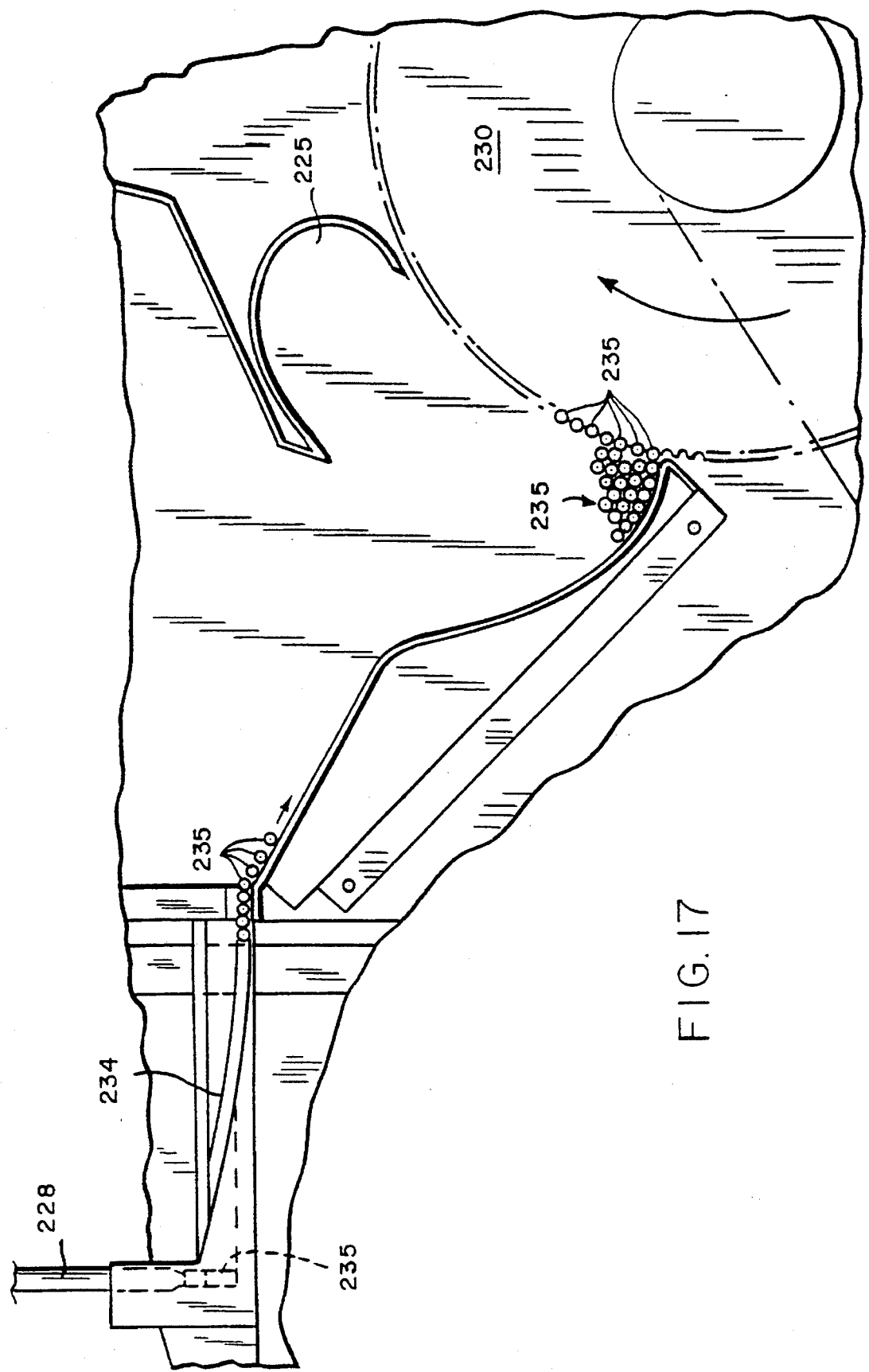
FIG. 17 is a partial elevational view of the plug feeding device diagrammetically illustrating the loading of plugs into the accumulator and the plug feed drum.

The stopper supply device E' comprises a hopper 220 from which extend a plurality of parallel distributing tracks 223 (FIG. 2), an accumulator 225 and plug feed drum 230 (FIGS. 2, 17). The hopper is filled with plugs and electromagnetic vibrating means 222 associated with the hopper and tracks provide for effecting longitudinal orientation of the plugs 235, delivery into the tracks and movement along the tracks for delivery to the accumulator. The tracks 223 deliver the plugs into corresponding tubes 228 which deliver the plugs in a vertical position prior to entry into the accumulator 225. A plunger mechanism 232 (FIG. 2) pushes the plugs 235 through a quarter turn of a helical path 234 (FIG. 17) which turns the plugs from a vertical position and into a horizontal position to feed into the accumulator 225. From the accumulator, the plugs are picked up by plug feed drum 230 in the same manner as the capsules. The plug feed drum 230 transfers the plugs to a beveled wheel 238 (FIG. 2) which is constructed in the same manner as beveled wheel 90 (described with reference to FIG. 13). Beveled wheel 238 picks up the plugs in the horizontal position and delivers them to the closing device F' in the vertical position for closing the capsules.

Figure 18:
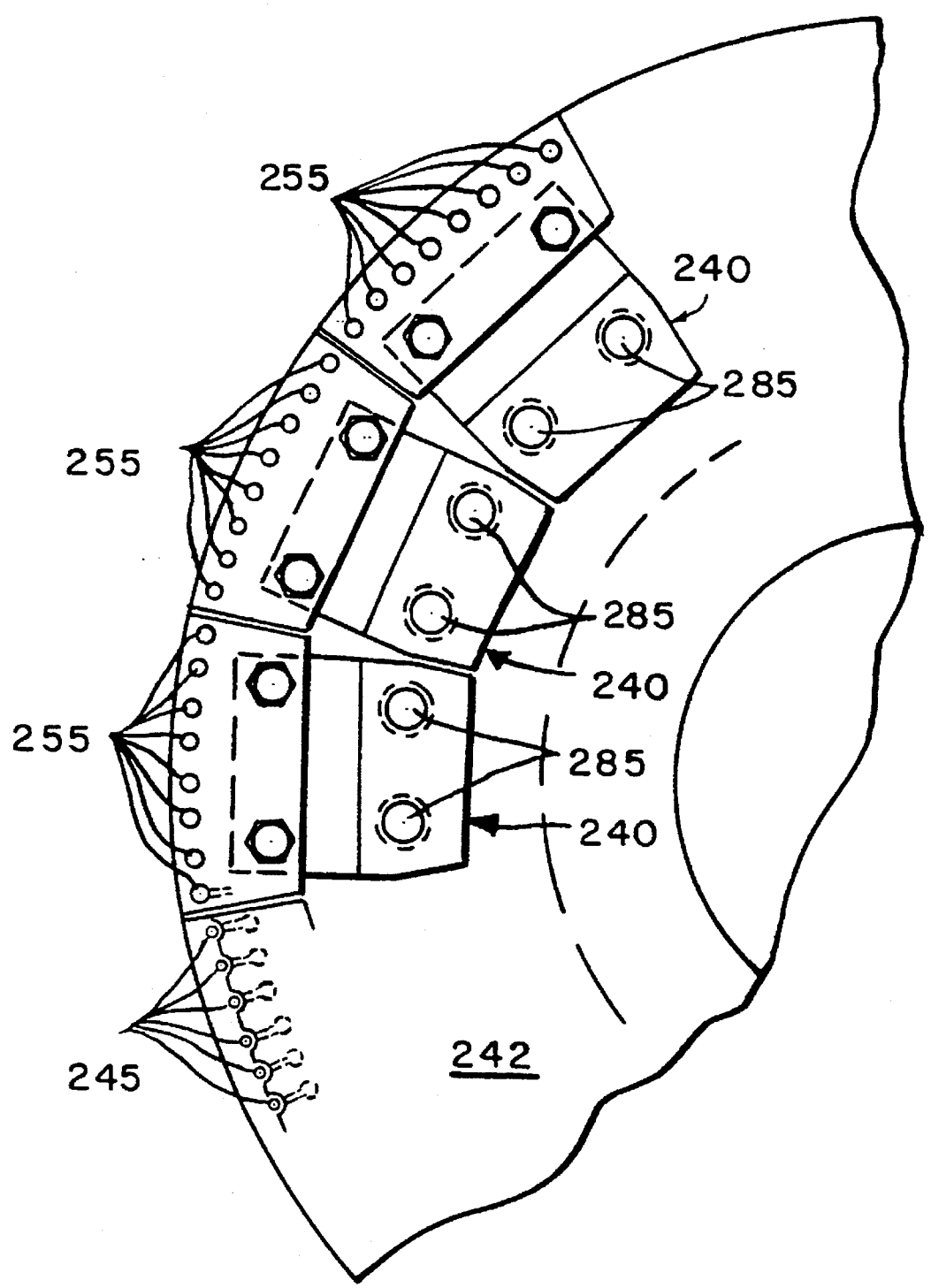
FIG. 18 is a plan view diagrammetically illustrating stations of the capsule closing device in the apparatus of FIG. 2.
Figure 19:
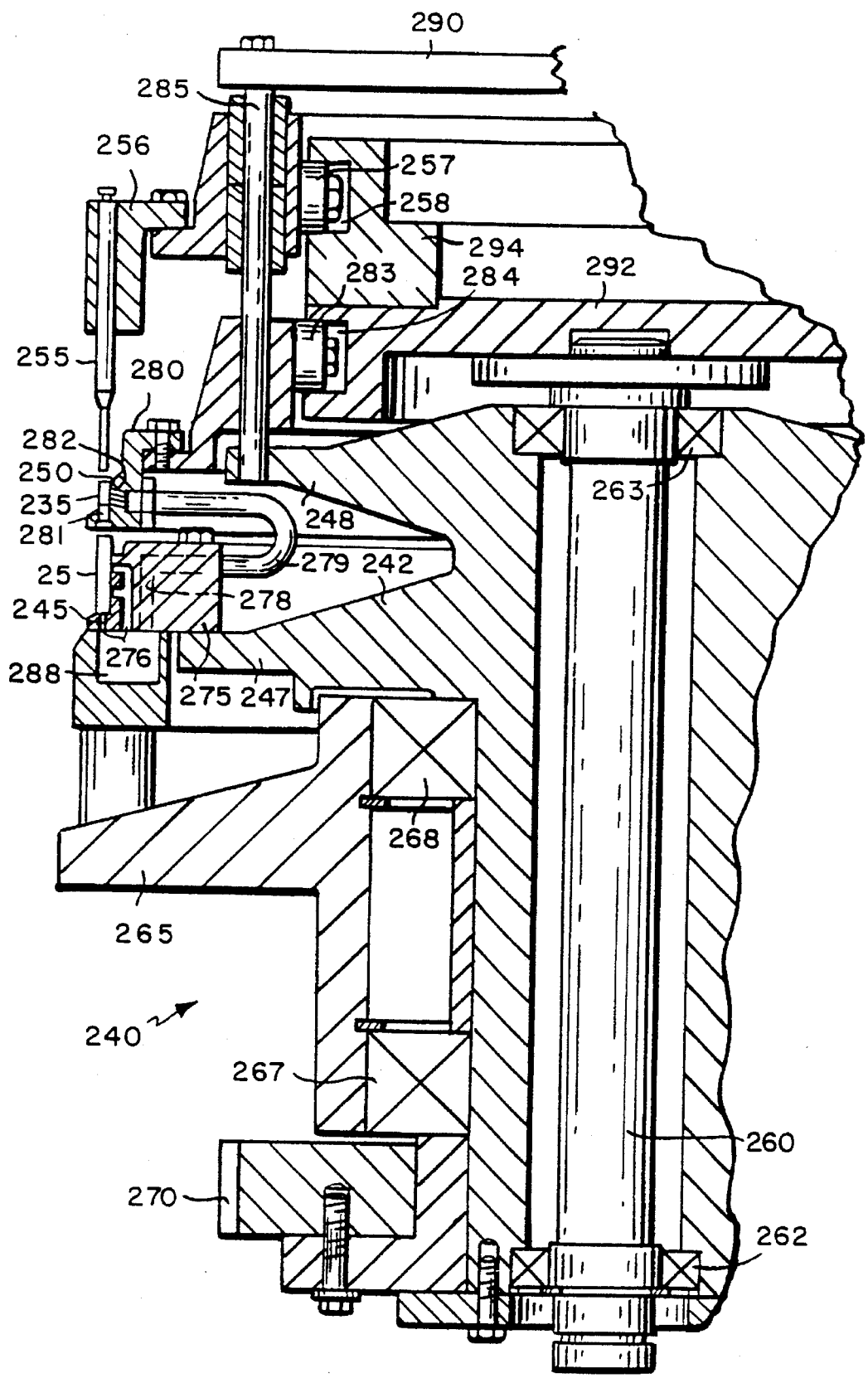
FIG. 19 is a partial sectional view in elevation, illustrating a station of the capsule closing device.

Closing device F' comprises a plurality of closing stations 240 mounted on the periphery of a wheel or drum supporting structure 242 (FIGS. 18, 19). Each station comprises a plurality of capsule seats 245 and plug seats 250 for holding capsules 25 and plugs 235 for the closing operation. For each corresponding pair of capsule and plug seats, there is a plunger 255 for pushing the plug 235 into capsule 25 to close the capsule.

Structurally, the closing device has a vertical shaft 260 around which is mounted a cylindrical support structure 242 which rotates on bearings 262, 263. The support structure 242 is rotatably supported by machine frame 265 by means of bearings 267, 268. Gear wheel 270 drive the support structure 242. the support structure 242 has two radial extensions 247, 248. Extension 247 supports capsule block 275, each block having eight capsule seats 245. Vacuum bores 276 supply vacuum to the capsule seat. Additional vacuum channels 278 supply vacuum to tubes 279 which in turn supply vacuum to the plug seats 250 through vacuum bores 282 in plug block 280. Plug block 280 is slideably mounted on rods 285. Rods 285 in turn are mounted on radial extension 248 and supported at their upper end by plate 290. Plunger block 256 is also slideably supported by rods 285. Plunger block 256, plug block 280 and capsule block 275 each contain a corresponding number of plungers 255, plug seats 250 and capsule seats 245, respectively.

Vacuum is supplied to the stations through channel 288 which is supported from the machine frame 265.

The plug block 280 and plunger block 256 are moved on rods 285 by cam followers 283 and 257, respectively. The motion is of the cam followers 283, 257 is controlled by cam tracks 284, 258, respectively. The cam tracks are machined into plate 292 and annulus 294 which is attached to plate 292. Plate 292 in turn is mounted to the top end of vertical shaft 260 which is fixedly supported by the machine frame (not shown).

Figure 20:
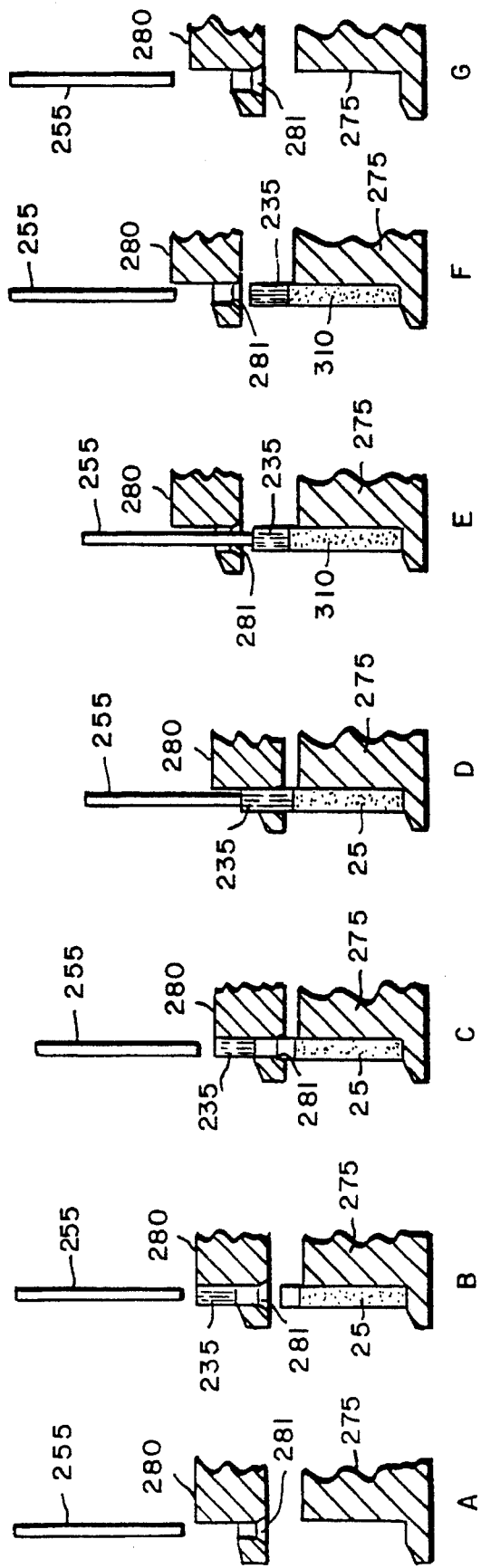
FIG. 20 diagrammetically shows the sequence of movement of the stations of the closing device for inserting plugs to close the filled capsules.

The sequence of operation of the closing stations 240 is illustrated by FIG. 20. The station in position a is empty ready to receive a filled capsule 25 and a plug 235. In position b, the station has been loaded with both a capsule and a plug and is ready to begin the closing operation. The closing operation begins by the movement of plug block 280, in accord with the cam follower 283 following cam track 284, positioning the plug block in contact with the top of capsule 25 as shown in position c, FIG. 20. In position d, the plunger 255 pushes the plug 235 through the aperture 281 in the plug block 280 and into capsule 25, thereby closing the capsule. The aperture 281 may preferably formed of a resilient material to provide a small resistance to a hard plug as it is pushed through. If the plug is resilient, the aperature may preferably by slightly smaller in diameter to provide resistance. Alternatively, no resistance may be desired, relying solely on the vacuum through bores 282 (FIG. 19) to hold the plug until pushed into the aperture 281.

In position e, FIG. 20, the station shows that plug block 280 has been raised to its initial position which is above the plug 235 which has been inserted into capsule 25 to form a closed capsule 300. The plunger 255 is still in contact with the inserted plug 235 as the plug block 28 is raised by the cam follower 283. As shown by position f, FIG. 20, the plunger 255 is now returned to its original position by cam follower 257 in cam track 258. The closed capsule 300 is then removed from the closing device F, and the station, as shown in position g, is ready to start a new cycle.

Closed capsules 300 are unloaded from the closing device F, by a conventional stripping mechanism (not shown) and exit the apparatus in a channel at the point marked EXIT (FIG. 2). From there the capsules 300 can be loaded into a magazine or placed on a conveyor, etc. by conventional means (not shown) for packaging or further processing.

The foregoing relates to a preferred exemplary embodiment of the invention, it being understood that other variants and embodiments thereof are possible within the spirit and scope of the invention, the latter being defined by the appended claims. For example, the various stations can be designed to accommodate more or less capsules or plugs, and various conventional transfer devices may be added or substituted between devices. Further, the capsules are preferably cylindrically-shaped with a circular cross section. However, other cross-sectional shapes can as easily be used with corresponding changes to the bores and other parts of the machine. The capsules are preferably a metal such as aluminum or steel, but can be of other materials depending upon the product or filling material.

What is claimed is:

1. A machine for making fuel element/aerosol generating cartridges for smoking articles by continuously filling elongated containers, which are open at one end and at least partially closed at the other end, with an aerosol generating material through the open end and continuously inserting a fuel element in the open end, the machine comprising:

an orienting device comprising a plurality of continuously moving orientation stations, each orientation station having a seat for receiving and holding elongated containers in randomly oriented positions, a selecting device for selecting containers, and an orientation cylinder for orienting selected containers to position them in a predetermined orientation, each orientation cylinder being adapted to receive containers which are not in the predetermined orientation and having a means for rotating the containers so that they are placed in the predetermined orientation;

a filling device comprising a plurality of continuously moving filling stations, each filling station having a filling seat for continuously receiving and holding oriented containers, and apparatus for continuously measuring a predetermined amount of aerosol generating material and filling each container with a predetermined amount of material;

a closing device comprising a plurality of continuously moving closing stations, each closing station having a container seat for receiving and holding filled containers, a fuel element seat for receiving and holding fuel elements, and apparatus for continuously inserting fuel elements into the open ends of filled containers to provide closed containers;

container supply apparatus for continuously supplying randomly oriented containers to the orienting device;

transfer apparatus for continuously transferring containers between the orienting device, the filling device and the closing device;

fuel element supply apparatus for continuously supplying fuel elements to the closing device; and unloading apparatus for continuously removing closed containers from the machine.

2. The machine of claim 1 wherein the orienting stations move in an endless path.

3. The machine of claim 1 wherein the orienting stations move in a circular path.

4. The machine of claim 1 wherein the orienting stations are mounted on a rotating device.

5. The machine of claim 1 wherein each orienting station comprises a reciprocating pin apparatus for pushing selected containers from a first position to load a rotary orientation device, apparatus for rotating the orientation device to orient the container into a predetermined orientation, and second reciprocating pin apparatus for pushing the oriented container back to the first position.

6. The machine of claim 5 wherein the movement of the first and second reciprocating pins are timed and controlled by cam followers following cam tracks.

7. The machine of claim 5 wherein the rotation of the rotary orientation device is timed and controlled by a cam follower following a cam track.

8. The machine of claim 1 wherein the filling device comprises a metering disk having a plurality of feed bores positioned on the periphery of the disk, each bore having a predetermined volume, and a filling seat corresponding to each feed bore, each filling station comprising a seal for closing a feed bore to contain aerosol generating material as the feed hole is filled and reciprocating apparatus for moving the filling seat with container corresponding to the feed bore under the feed bore as the seal is moved to permit the material to fill the container.

9. The machine of claim 8 wherein the movement of the reciprocating apparatus is controlled and timed by a cam follower following a cam track.

10. The machine of claim 8 wherein each filling station comprises a plurality of filling seats for holding a corresponding number of containers and apparatus for simultaneously moving the containers relative to a corresponding number of feed bores in the metering disk to fill the containers.

11. The machine of claim 1 wherein the closing device comprises a retractable pin apparatus for pushing the fuel element into the open end of the filled container, wherein the fuel element seat is structured and adapted in relation to the container seat so that the fuel element scan be pushed in a straight path into the open end of the container.

12. The machine of claim 11, the closing device further comprising apparatus for restraining movement of the open end of the container as the fuel element is inserted.

13. The machine of claim 12, wherein the movement of the apparatus for restraining is timed and controlled by a cam follower following a cam track.

14. The machine of claim 11 wherein movement of the retractable pin apparatus is timed and controlled by a cam follower following a cam track.

15. A machine for continuously making fuel element/ aerosol generating cartridges for smoking articles by filling elongated containers, which are open at one end and at least partially closed at the other end, with an aerosol generating material through the open end and inserting a fuel element in the open end, the machine comprising:

an orienting device comprising a plurality of continuously moving orientation stations, each orientation station having a seat for receiving and holding elongated containers in randomly oriented positions, a selecting device for selecting containers, and an orientation cylinder for orienting selected containers to position them in a predetermined orientation;

a filling device comprising a plurality of continuously moving filling stations, each filling station having a filling seat for receiving and holding oriented containers, and apparatus for measuring a predetermined amount of aerosol generating material and filling each container with a predetermined amount of material;

a closing device comprising a plurality of continuously moving closing stations, each closing station having a container seat for receiving and holding filled containers, a fuel element seat for receiving and holding fuel elements, and apparatus for inserting the fuel element into the open end of the filled container to provide a closed container;

container supply apparatus for supplying randomly oriented containers to the orienting device;

transfer apparatus for transferring containers between the orienting device, the filling device and the closing device;

fuel element supply apparatus for supplying fuel element to the closing device; and unloading apparatus for removing closed containers from the machine, wherein oriented containers are transferred from the orienting device to the filling device by means of a beveled wheel positioned at a 45 degree angle to pick up the containers from the orienting device in horizontal position and deliver them to the filling device in a vertical position open end up.

16. A machine for continuously filling containers with a free-flowing powder or granular filler material and closing the containers by insertion of a plug, the machine comprising:

container supply apparatus for providing a continuous supply of randomly oriented containers, the containers being open at one end and at least partially closed at the opposite end to contain a predetermined quantity of filler material;

orienting apparatus for continuously orienting the containers into a predetermined orientation, the orienting apparatus comprising an endless cycle of continuously moving orientation stations, each station having selection apparatus means for selecting containers having one predetermined orientation, and having orientation apparatus means for receiving and rotating the selected containers into another predetermined orientation, non-selected containers remaining in their original orientation;

filler material supply apparatus for continuously supplying the free-flowing powder or granular filler material for filling the containers;

filling apparatus for continuously filling containers, the filling apparatus comprising an endless cycle of continuously moving filling stations, each station having apparatus for continuously measuring a predetermined quantity of filling material and transferring the filling material to a container;

plug supply apparatus for providing a continuous supply of plugs for closing the containers; and closing apparatus for continuously inserting plugs into the open end of containers to close the containers, the closing apparatus comprising an endless cycle of closing stations, each station having first apparatus for holding a filled container, second apparatus for holding a plug in fixed relation with the container, and third apparatus for inserting the plug into the container.

17. Apparatus for continuously orienting randomly oriented containers having one open end and one, at least partially, closed end into a predetermined orientation, the apparatus comprising a plurality of orientation stations positioned on the periphery of a rotatable device, each station comprising: a seat for receiving a container in a random orientation and holding the container in a position parallel to a longitudinal axis of the seat, with the ends of the container positioned for determining whether the container is in the predetermined orientation and selecting containers for orienting into the predetermined orientation; a selection device for determining whether the container is in the predetermined orientation and for selecting containers for orienting into the predetermined orientation; and an orienting device for rotating the selected containers to place them in the predetermined orientation.

18. The apparatus of claim 17 wherein the selection device comprises a reciprocating push pin apparatus which selects containers by pushing containers having their closed or partially closed end oriented toward the push pin to load the orienting device and does not push containers having their open end oriented toward the push pin.

19. The apparatus of claim 18 wherein the apparatus further comprises a second push pin apparatus that pushes the rotated container from the orienting device.

20. The apparatus of claim 19 wherein each station is adapted and arranged to select and orient a plurality of containers simultaneously.

* * * * *